United States Patent [19]

Schantz et al.

[11] Patent Number: 5,195,764
[45] Date of Patent: Mar. 23, 1993

[54] SPRING LOADED RETRACTABLE WHEEL TRAILER

[76] Inventors: Ray G. Schantz, 105 N. Duncan;
Michael A. Schantz, 109 S. Duncan, both of Marine, Ill. 62061

[21] Appl. No.: 779,953

[22] Filed: Oct. 21, 1991

[51] Int. Cl.$^5$ .............................................. B60P 1/18
[52] U.S. Cl. .............................. 280/43.23; 240/43.22; 414/476; 414/483
[58] Field of Search .................. 280/43, 43.11, 43.13, 280/43.17, 43.18, 43.19, 43.22, 43.23, 149.2, 789, 80.1; 414/474, 475, 476, 480, 482, 483, 484, 485

[56] References Cited

U.S. PATENT DOCUMENTS

| | | | |
|---|---|---|---|
| 2,130,980 | 4/1964 | Monroe et al. | 260/43.23 |
| 2,587,624 | 3/1952 | Johnson | 280/43.23 |
| 2,762,631 | 9/1956 | Entz | 280/43.23 |
| 2,767,538 | 10/1956 | Scheidenhelm | 280/43.23 |
| 2,918,298 | 12/1959 | Starr | 280/43.23 |
| 2,994,544 | 8/1961 | Wok | 280/43.23 |
| 4,043,403 | 8/1977 | Anderson et al. | 280/43.23 |
| 4,058,325 | 11/1977 | Schramm | 280/43.18 |
| 4,943,202 | 7/1990 | Galloway | 280/43.23 |

*Primary Examiner*—Richard M. Camby
*Attorney, Agent, or Firm*—Robbins & Robbins

[57] ABSTRACT

A rectractable trailer having a spring loaded hydraulic piston is provided. The trailer has a bell crank connection for the axles to enable the trailer to be moved between a lowered loading position to an elevated traveling position. The hydraulic piston powers an operating train for raising and lowering the axles. In the operating train the hydraulic piston is pivotally connected to a forward end of a cradle or carriage slidable longitudinally upon a rail-like frame. A rear portion of the cradle is pivotally connected to a telescopic spring loaded operating rod which is pivotally connected at a rear end to an arm of the bell crank axle which is raised and lowered by the hydraulic piston and the operating train. The bell crank axle is comprised of an axle journalled to the trailer bed with the operating arm keyed to the axle at an angle to a wheel supporting arm in such a manner that reciprocation of the piston and the operating train causes angular movement of the bell crank axle to effect the raising and lowering. The operating rod and train effect a linear movement to minimize stress and provide a cushioned support of the bed in raising and lowering and road travel. The operation of the piston may be effected by a remote transmitter from the cab of the vehicle and by a switch on the trailer.

14 Claims, 3 Drawing Sheets

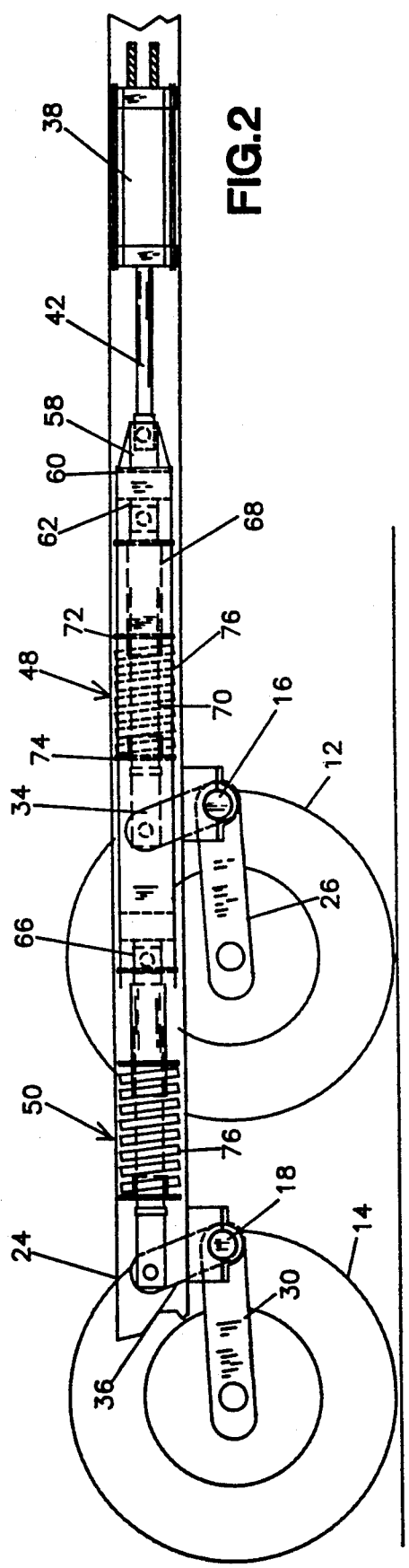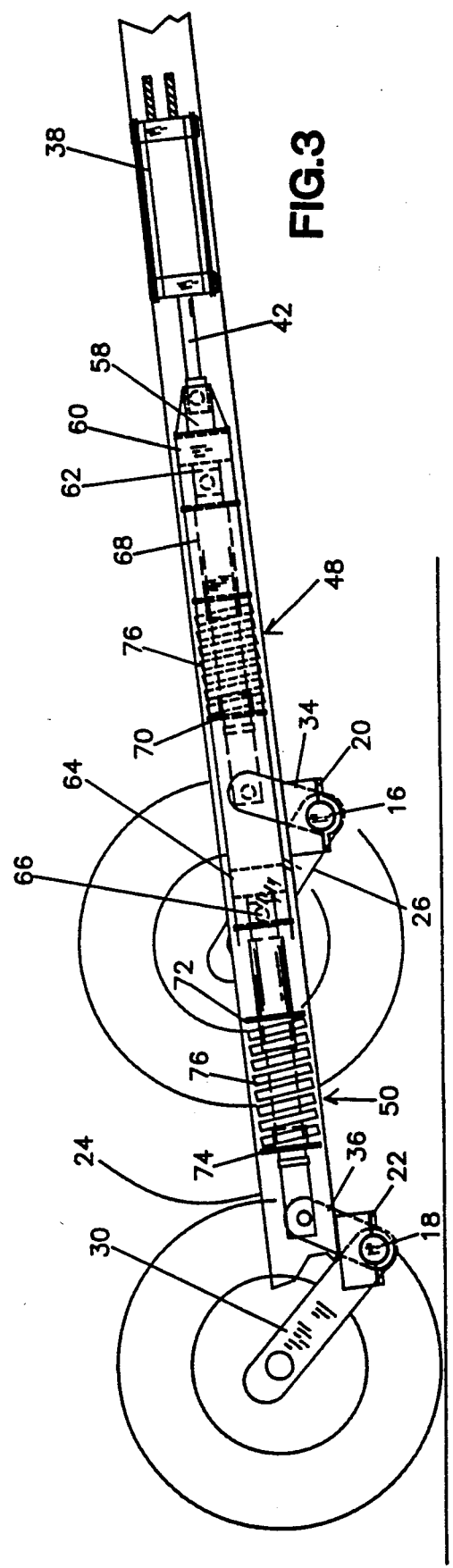

SPRING LOADED RETRACTABLE WHEEL TRAILER

BACKGROUND OF THE INVENTION

In the past various types of retractable trailers have been employed. In general, some of these have employed bell crank axles journalled to the trailer bed which may be operated by a hydraulic cylinder to raise and lower the bed with respect to the wheels. The lowered bed facilitates loading and unloading of the bed while the raised bed provides for proper road clearance in road travel.

Such trailers have required complex linkages for operation in raising and lowering the bed and have been subject to shock and vibration in the raising and lowering of the bed as well as in over the road travel. Further, the provision for raising and lowering tandem wheel sets employing two or three pairs of wheels has occasioned additional stress and complications in the required linkage for operation to the raised and lowered positions as well as road travel.

SUMMARY OF THE INVENTION

By means of this invention there has been provided a retractable wheel trailer that may be simply constructed to provide one that is easily raised and lowered and employed in road travel with a spring and cushioned action that greatly reduces vibration and shock. The basic operating structure may easily be constructed for single or tandem pairs of wheels.

The raising and lowering of the trailer bed is effected by an essentially in line operating train which pivots a bell crank axle journalled to the trailer bed for each pair of wheels. The bell crank axle comprises a pair of wheel arms keyed to the axle and an operating arm keyed to the axle at an angle to the aforementioned wheel arms whereby movement of the operating arm by the operating train effects the raising and lowering of the trailer bed.

The operating train is comprised of a cradle or carriage reciprocally moveable upon a rail frame fixedly connected to the trailer bed. The cradle is powered to move back and forth by piston of a hydraulic cylinder at the front and is connected at the rear to the operating arm of the bell crank axle by a spring cushioned operating rod.

The spring cushioned operating rod provides a slightly pivotable in line connection between the cradle and the bell crank axle and serves as a thrust or force delivering element which may by means or a biasing compression spring serves to absorb shock in the raising and lowering of the trailer bed and in road travel. The compression spring is mounted around inner and outer telescopic operating rod members and is compressively biased against stops on each of the members. When the hydraulic cylinder is operated to move the piston, the telescopic heavy duty spring cushioned operating rod through the intermediate slidable cradle serves to push or pull the operating arm of the bell crank axle to raise or lower the trailer bed as well as provide a spring cushioned connection for over the road travel to absorb shock and vibration.

The operation of the hydraulic cylinder is simply effected by a conventional manual switch connected to the hydraulic pump associated with the hydraulic cylinder or a remote control wireless transmitter in the cab of the vehicle. In the latter case, the raising and lowering of the trailer bed may be simply effected from the driver's seat without the necessity of getting out of the vehicle.

The retractable wheel trailer provides a simply constructed, rugged and easy to operate structure for raising and lowering a trailer bed. The operating train between the hydraulic cylinder and the bell crank axle comprised of the slidable cradle on the rail frame and the heavy duty spring loaded telescopic operating rod minimizes stress while absorbing shock through the in line push and pull thrust operation.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

FIG. 2 is a view in right side elevation showing the trailer in raised position.

FIG. 3 is a view similar to FIG. 2 showing the trailer in lowered position.

DESCRIPTION OF THE INVENTION

Figure 1:
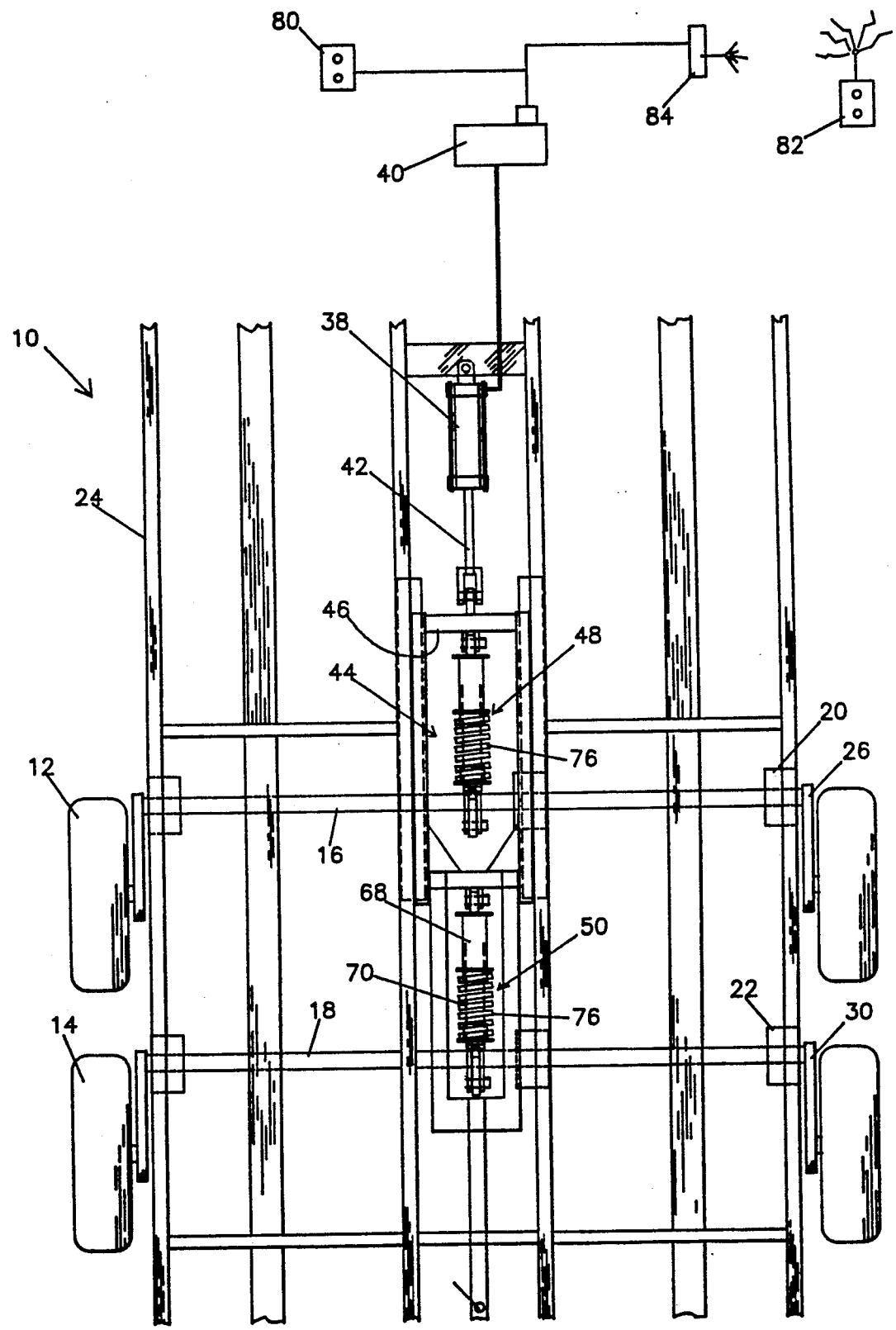
FIG. 1 is a top plan view of the retractable wheel trailer.

The retractable wheel trailer of this invention is generally indicated by the reference numeral 10 in FIGS. 1 through 4. The trailer is comprised of tandem wheels, namely a front pair of wheels 12 and a rear pair of wheels 14 supported on bell crank axles 16 and 18, respectively. The axles 16 and 18 are journalled on bearings 20 and 22 connected to a trailer bed or frame 24 as best shown in FIG. 1.

The bell crank axles 16 and 18 are each provided with a pair of wheel supporting arms 26 for the front wheels and 30 for the rear wheels. An axle operating arm 34 is keyed to the front axle while a similar axle operating arm 36 is keyed to the rear axle.

The operation of the retractable wheel trailer is effected by a conventional hydraulic cylinder 38 and pump 40 through a reciprocable piston 42. The piston 42 serves to move the bell crank axles 16 and 18 about the journals 20 and 22 by moving the axle operating arms back and forth through an intermediate operating train 44 connecting the operating arms to the piston 42. An essentially in line spring loaded powering movement is provided by the operating train as will be described more fully hereinbelow.

The operating train 44 is comprised of a cradle 46 and a pair of spring loaded operating rods 48 and 50 connecting the hydraulic cylinder piston 42 with operating arms 34 and 36 of the bell crank axles 16 and 18. It is through this operating train connection that by actuation of the hydraulic cylinder the trailer bed may be raised and lowered with the shock absorbing feature provided by the spring loaded operating rods.

Figure 4:
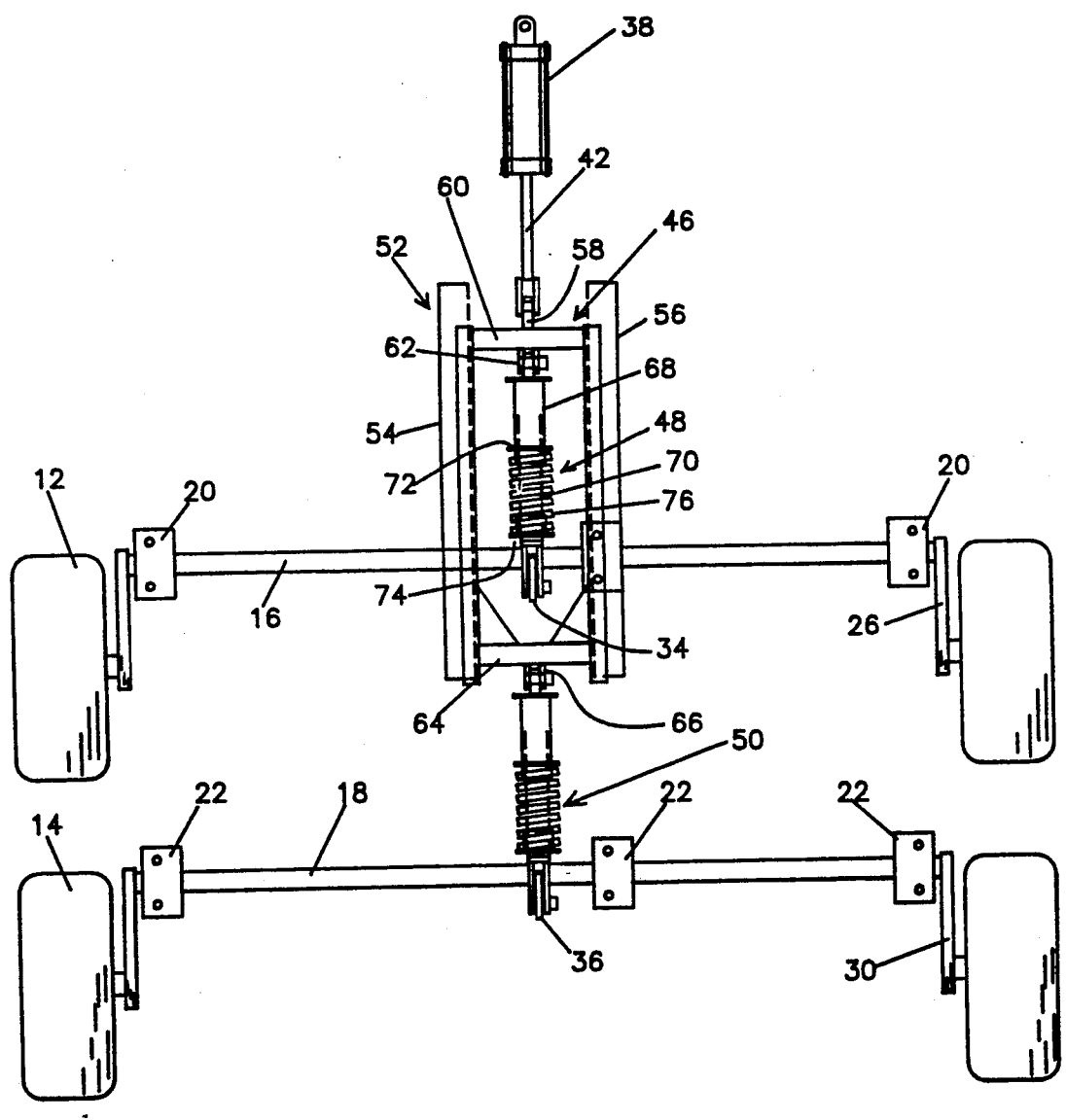
FIG. 4 is a view similar to FIG. 1 with the bed removed.

The cradle or carriage 46 is best shown in FIGS. 1 and 4. It is supported on a rail frame 52 fixed to the underside of the trailer bed. A pair of C-shaped rails 54 and 56 restrain the cradle while permitting slidable longitudinal movement responsive to the movement of the hydraulic cylinder piston 38 which is pivotally connected to a lug 58 on a cross bar 60 at the front of the cradle. The operating rod 48 is similarly pivotally connected to the rear of the cross bar 60 of the cradle on a lug 62. The operating rod 50 is in like fashion pivotally connected to the cross bar 64 at the rear of the cradle by a lug 66.

The spring loaded operating rods 48 and 50 are identical in construction and the same reference numerals are employed for their components. Each operating rod is telescopic and is comprised of an outer tubular member 68 which may be pivotally linked to the lugs 62 and 66 of the cradle. An inner tubular or rod-like member 70 may be pivotally linked to the operating arms 34 and 36 of the bell crank axles 16 and 18. Stop elements in the form of flanges 72 and 74 on the telescopic members restrain a heavy duty helical compression spring 76 which fits coaxially around the telescopic members of the operating rods and bears against the stops to absorb shock while being under sufficient load to transmit power to the operating arms responsive to the actuation of the hydraulic cylinder and movement of the piston 42.

Actuation of the pump 40 and hydraulic cylinder may be effected by the manual switch 80 shown in FIG. 1 through a conventional electrical circuit employing a battery (not shown). Remote control may also desirably be employed by a wireless transmitter 82 positioned in the cab of the towing vehicle to transmit a raise or lower signal to a receiver switch 84 located on the trailer. The transmitter 82 and receiver switch 84 may be of conventional construction such as that employed in garage door openers or the like and form no part of this invention, per se. The employment in the trailer however, provides a great convenience for remote operation in raising and lowering the trailer bed for loading or unloading by others without requiring the driver to vacate the cab.

USE

The retractable wheel trailer is simply operated from either manual switch 80 at the trailer or the remote control switch 82 from the cab of the vehicle. Both switches are equipped with a conventional "raise" and "lower" button. When the "raise" button is depressed to elevate the trailer bed, it is moved to the raised position shown in FIG. 2. In this position the hydraulic cylinder 38 is actuated by the pump 40 to extend the piston 42 and move the operating train 44 comprising the cradle 46 and operating rods 48 and 50 to rotate the operating arms 34 and 36 in a counter clockwise direction from the position shown in FIG. 2 to the position shown in FIG. 3. This movement causes the bell crank axles 16 and 18 to which the operating arms are keyed to rotate and elevate the trailer bed.

In the aforementioned operation the heavy duty compression spring 76 in the telescopic operating rods serves as the direct connection to transmit the force to elevate the trailer bed and support it on the bell crank axles. As a result, the spring serves to absorb shock and vibration throughout the operation in a supporting and load cushioning manner.

In order to lower the trailer bed from the position shown in FIG. 2 to the position shown in FIG. 3 the "lower" button of either switch 80 or 82 is depressed. When so depressed by the operation of the pump 40 and hydraulic cylinder, the piston 42 is retracted to the position shown in FIG. 3. The operating train is moved to the right from the raised position shown in FIG. 2 to the lowered position shown in FIG. 3 and the operating arms 34 and 36 are moved clockwise to lower the bell crank axles 16 and 18 and lower the trailer bed. This may be effected either by the weight of the trailer bed acting on the bell crank axles or by force of the piston 42. As viewed in FIG. 3, the trailer bed is inclined and the forward set of wheels 12 may be lifted slightly off the ground due to the fixed height of the front of the trailer at the hitch connection (not shown) to the towing vehicle. The slight incline of the trailer bed permits the rear of the trailer bed to be lowered to various positions at the rear of the trailer to accommodate uneven ground or the like to facilitate the loading or unloading operation. When the trailer is in the raised position a lock pin may be used to fix the operating train in a locked position.

Various changes and modifications may be made within this invention as will be apparent to those skilled in the art. Such changes and modifications are within the scope and teaching of this invention as defined in the claims appended hereto.

What is claimed is:

1. A retractable wheel trailer comprising a trailer bed, a bell crank axle journalled to the bed, said bell crank axle having a pair of wheel supporting arms keyed to said axle at an angle to an axle operating arm and operating means connected to said axle operating arm for pivotally moving said axle operating arm about an axis of said axle to effect raising and lowering of the trailer bed, said operating means comprising a hydraulic cylinder having a reciprocable piston connected to an operating train connected to said axle operating arm, said operating train comprising a rail support connected to said bed and supporting a cradle reciprocally slidable upon said rail support, said cradle being connected at a forward portion to said piston and at a rear portion to said operating arm.

2. The retractable wheel trailer of claim 1 in which said operating train includes a longitudinally spring biased operating rod connected at a forward portion to said cradle and at a rear portion to said axle operating arm.

3. The retractable wheel trailer of claim 2 in which said operating rod is comprised of inner and outer telescopic members having opposed stop elements and a helical spring compressively biasable against said stop elements to absorb shock in the operation of the raising and lowering of the retractable wheel trailer and road travel.

4. The retractable wheel trailer of claim 1 in which said operating means includes an operating rod connected between said cradle and said operating arm, said operating rod consisting of a telescopic rod member having a heavy duty helical spring connected coaxially with said telescopic rod and adapter to bear against opposed stop elements on telescopic inner and outer elements comprising said telescopic rod member, said operating rod serving to transmit force to said operating arm to raise and lower said trailer bed and absorb shock, a rail support connected to said bed and supporting a cradle reciprocally slidable upon said bed, said cradle being connected at a forward portion to said piston and at a rear portion to said operating arm.

5. The retractable wheel trailer of claim 4 in which said cradle and said piston are connected and operated substantially longitudinally in a direct line to said operating arm.

6. The retractable wheel trailer of claim 1 in which said rail support is fixed to said trailer and comprises a pair of rails restraining said cradle against lateral and vertical movement while providing for longitudinal movement.

7. The retractable wheel trailer of claim 1 in which a tandem wheel trailer is provided with forward and rearward sets of wheels, each of said set of wheels being provided with a separate bell crank axle and each of said axles having an operating arm separately connected to said cradle.

8. The retractable wheel trailer of claim 1 in which a wireless remote control switch is positioned in a towing vehicle to provide a signal for operating said hydraulic cylinder.

9. A retractable wheel trailer comprising a trailer bed, a bell crank axle journalled to the bed, said bell crank axle having a pair of wheel supporting arms keyed to said axle at an angle to an axle operating arm and operating means connected to an axle operating arm for pivotally moving said axle operating arm about an axis of said axle to effect raising and lowering of the trailer bed, said operating means comprising a hydraulic cylinder having a reciprocable piston connected to an operating train connected to said axle operating arm, support means pivotally connecting said operating train to said piston, said support means comprising means for limiting it to axial movement with said piston, said operating train comprising an operating rod consisting of a telescopic rod member having a heavy duty helical spring connected coaxially with said telescopic rod and adapted to bear against opposed stop elements on telescopic inner and outer elements comprising said telescopic rod member, said operating rod serving to transmit force to said operating arm to raise and lower said trailer bed and absorb shock.

10. A retractable wheel trailer comprising a trailer bed, a bell crank axle journalled to the bed, said bell crank axle having a pair of wheel supporting arms keyed to said axle at an angle to an axle operating arm and operating means connected to an axle operating arm for pivotally moving said axle operating arm about an axis of said axle to effect raising and lowering of the trailer bed, said operating means comprising a hydraulic cylinder having a reciprocable piston connected to an operating train connected to said axle operating arm, said operating train comprising an operating rod consisting of a telescopic rod member having a heavy duty helical spring connected coaxially with said telescopic rod and adapted to bear against opposed stop elements on telescopic inner and outer elements comprising said telescopic rod member, said operating rod serving to transmit force to said operating arm to raise and lower said trailer bed and absorb shock and said operating train including a rail support connected to said bed and supporting a cradle reciprocally slidable upon said bed, said cradle being connected at a forward portion to said piston and at a rear portion to said operating rod.

11. The retractable wheel trailer of claim 10 in which a tandem wheel trailer is provided with forward and rearward sets of wheels, each of said set of wheels being provided with a separate bell crank axle, and each of said axles having an operating arm separately connected to said cradle.

12. The retractable wheel trailer of claim 10 in which said rail support is fixed to said trailer and comprises a pair of rails restraining said cradle against lateral and vertical movement while providing for longitudinal movement.

13. The retractable wheel trailer of claim 10 in which said operating rod, said cradle and said piston are connected and operated substantially longitudinally in a direct line to said operating arm.

14. A retractable wheel trailer comprising a trailer bed, a bell crank axle journalled to the bed, said bell crank axle having a pair of wheel supporting arms keyed to said axle at an angle to an axle operating arm and operating means connected to an axle operating arm for pivotally moving said axle operating arm about an axis of said axle to effect raising and lowering of the trailer bed, said operating means comprising a hydraulic cylinder having a reciprocable piston connected to an operating train connected to said axle operating arm, said operating train comprising an operating rod consisting of a telescopic rod member having a heavy duty helical spring connected coaxially with said telescopic rod and adapted to bear against opposed stop elements on telescopic inner and outer elements comprising said telescopic rod member, said operating rod serving to transmit force to said operating arm to raise and lower said trailer bed and absorb shock and a wireless remote control switch positioned in a towing vehicle to provide a signal for operating said hydraulic cylinder.

* * * * *